March 29, 1966 A. MACOVSKI 3,243,507

BANDWIDTH REDUCTION FACSIMILE SYSTEM

Filed March 8, 1963

INVENTOR.
ALBERT MACOVSKI
BY Samuel Lindenberg
ATTORNEY 3,243,507

BANDWIDTH REDUCTION FACSIMILE SYSTEM

Albert Macovski, Palo Alto, Calif., assignor to Stanford Research Institute, Palo Alto, Calif., a corporation of California Filed Mar. 8, 1963, Ser. No. 263,781
4 Claims. (Cl. 178—6)

This invention relates to facsimile transmission systems and more particularly to apparatus for increasing the speed of transmission without increasing the bandwidth required therefore.

Facsimile transmission systems usually involve at a transmitter, a revolving drum on which a document to be scanned for transmission is placed. A photoelectric scanner is positioned adjacent the drum to receive one picture element from the document at a time. The drum is rotated relative to the position of the scanning device in a manner so that the scanning device effectively sees a helical path on the surface of the drum which covers the entire document. This is effectuated either by rotating the drum and moving the scanning device in a line transversely across the surface of the drum, or holding the scanning device still and rotating the drum while moving it along its axis. The signals derived by the scanning device are then transmitted to a receiver. At the receiver a writing stylus is positioned relative to another drum which is moved synchronously with the drum at the transmitter. The received signals are applied to the stylus which thereupon converts these to picture elements on the document on the drum whereby the information which is contained on the document at the transmitter is reproduced at the receiver.

In order to speed up the transmission process, the scanning process has been speeded up by increasing the speed of rotation of the drum. This, however, has the drawback that more bandwidth is required for transmitting the information to the receiver.

An object of this invention is the provision of a system for increasing the speed of transmission of information in a facsimile system without increasing the bandwidth required.

Another object of this invention is the provision of a novel transmitting and receiving arrangement for a facsimile system whereby a faster rate of transmission of the information on a document is effectuated than has been done heretofore.

Still another object of the present invention is the provision of a novel, useful and unique system for transmitting facsimile information.

These and other objects of the invention may be achieved in an arrangement for transmitting facsimile information wherein at the transmitter, instead of a single picture element scanning device being positioned adjacent a document being scanned, a plurality of these devices are positioned for scanning simultaneously a plurality of picture elements on the document at the receiver. The signals which each one of these plurality of picture elements derives from the document is converted into a binary signal representative of the picture element. All these binary signals are then applied to a digital-to-analog converter in order to be converted into a single representative analog signal. This analog signal is then transmitted to a receiver where it is applied to an analog-to-digital converter. This device reproduces the binary signals which are represented by the analog signal. A plurality of writing transducers are provided which are similarily positioned relative to a synchronously operating drum, as are the picture element scanning transducers at the receiver. Means are provided for applying the plurality of reproduced binary signals to the respective writing transducers in order that the picture elements represented by these binary signals be reproduced in proper juxtaposition at the receiver. Accordingly, it is possible to reduce the time required to scan a docket by a factor determined by the number of scanning and reproducing elements which are employed.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
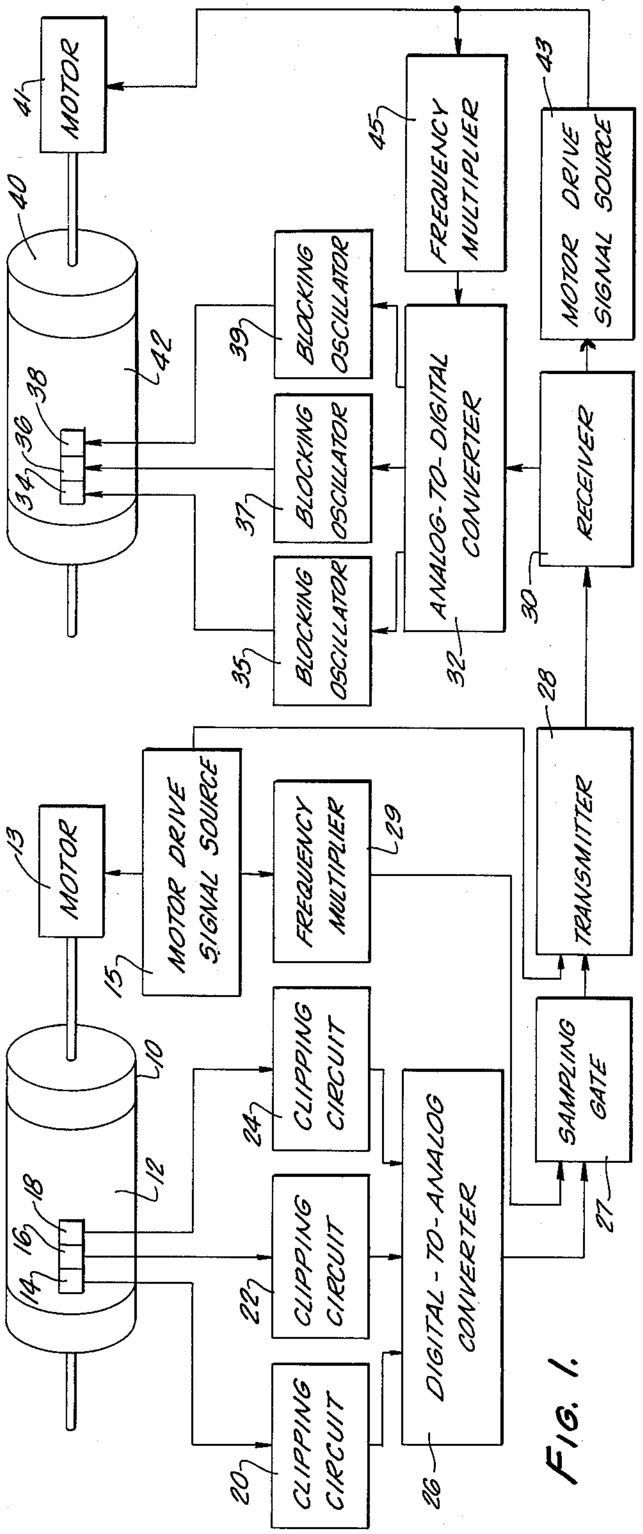
FIGURE 1 is a schematic diagram of the embodiment of the invention.

Referring now to FIGURE 1, in accordance with this invention at a facsimile transmitter there is provided a drum 10, upon which a document 12, having information to be transmitted, is placed. Since the mechanism for rotating a drum and providing information to remotely located receiver for effectuating a synchronous rotation of a drum located therewith is well known, the details thereof will not be described here. These usually comprise a motor 13, for driving the drum 12. The motor is driven from a source synchronizing signals 15, which are usually at a power line frequency or at a frequency derived from a power line frequency. Instead of a single photoelectric scanning device being employed for scanning a single picture element at a time, in accordance with this invention, a plurality of the scanning devices, here represented by three scanning devices are respectively designated as photoelectric scanner 14, 16, 18, are employed. These three photoelectric scanners are positioned adjacent one another so that they effectively scan the picture elements on adjacent tracks. If the rotation of the drum, plus its lateral translation, is employed for effectuating scanning, then the lateral translation for each revolution that the drum rotates must be such as to take into consideration the presence of the three photoelectric scanning devices so that no overlap occurs during the scanning process.

It should be noted at this point that this invention is to be employed with documents which do not require half-tone images in order to be reproduced. That is, these documents are preferably written copy or diagrams, where a picture element may be reproduced by a binary signal. Three clipping circuits respectively 20, 22, 24, have the outputs from the scanning devices 14, 16, 18, respectively applied thereto for the purpose of providing a digital decision as to whether the picture elements involved are white or black. Thus, the outputs from the three clipping circuits 20, 22, 24, will comprise on-off signals or binary signals.

The outputs from the three clipping circuits are applied to a digital-to-analog converter 26, for the purpose of being converted to a single analog signal whose amplitude represents all of the digital outputs applied to the digital-to-analog converter input.

The output of the digital-to-analog converter may be applied to a sampling gate 27. This gate samples the digital-to-analog output once within the duration of each picture element. This sampling frequency falls within the transmitting bandwidth. For example, this may be for a bandwidth of 3 kc., on the order of 2 kc. The sampling signal frequency is obtained by a frequency multiplier 29 from the output of the motor drive signal source 15. The output of the sampling gate is applied to the transmitter 28 which transmits the analog signl to a receiver 30. The receiver applies the analog signal to an analog-to-digital converter 32. The function of this apparatus is to re-establish the binary signals which are represented by the analog signal. These reestablished binary signals are then applied to three blocking oscillators respectively 37, 39, 41. The blocking oscillators serve to standardize the width of each output signal to the width of a standard picture element. The outputs from the three blocking oscillators are respectively applied to three reproducing styli respectively 34, 36, 38, which are positioned relative to a drum 40, on which there is copy 42, so that the picture element produced by the reproducing transducers are identical with and identically positioned on the copy 42, as they were on the copy 12 from which the signals are derived. The drum 42 is synchronously rotated with the drum 12 by a motor 41, driven by signals from a motor drive signal source 43. The signals for this source are synchronized with the signals from the source 15, either by a direct transmission of signals or by a local derivation of signals, either system being well known to those skilled in this art. A frequency multiplier 45, is employed to provide clocking signals to the analog-to-digital converter 32, so that it will reconvert the analog signals received to digital signals at the same rate as these signals are sampled at the transmitter.

Since three scanning and reproducing elements are employed, the time required for scanning and reproducing a document is reduced by one-third. However, the bandwidth for transmitting the information is not increased since only a single signal is transmitted. The drum synchronizing signal is transmitted with present day systems and thus does not constitute an added burden on the transmission. It is important to note that the decrease in time stems completely from the fact that pickup and styli assemblies index over three lines during the scan rather than one line. As such, no additional mechanical complexities exist since the drum rotates at the original angular speed. In addition, the writing time of each picture element is unchanged whereby the same materials which could be employed previously can still be employed. This includes the standard facsimile papers.

The arrangement for sampling the analog signals at the transmitter and clocking the analog-to-digital converter at the receiver is to insure conversion at proper intervals and not during transition intervals of the analog signal. This arrangement is merely illustrative. There are other many well known ways of insuring synchronization of sampling and reconstruction but it is thought that the arrangement shown is the simplest. It is possible to omit the sampling gate at the transmitter for example, and at the receiver use the drum revolution synchronizing signals for clocking the analog-to-digital converter if these signals occur within picture scanning intervals, or when the transmitted analog signal is not in transition between picture elements.

The sole problem encountered in the exploitation of the analog capacity of a communication channel relates principally to noise considerations. The reliable discrimination of for example, eight analog levels requires a signal to noise ratio of approximately 18 db. Compression of greater than 3 to 1 can be readily visualized. A system with $n$ pickups and writing styli will have a bandwidth compression factor of $n$ and a requirement for $2^n$ distinguishable analog levels. A compression ratio of 3 to 1 is felt to be attainable with good reliability. Methods can be considered for minimizing the effects of vagaries within the communication channel. For example, digital-to-analog codes (such as Grey code) can be used which result in a minimum error in the presence of noise. In addition, the amplitude levels can be redefined following each scanning line such that slow drifts in transmission levels will be compensated for. However, considering the basic redundancy in the nature of the material transmitted, occasional errors can be tolerated.

Figure 2:
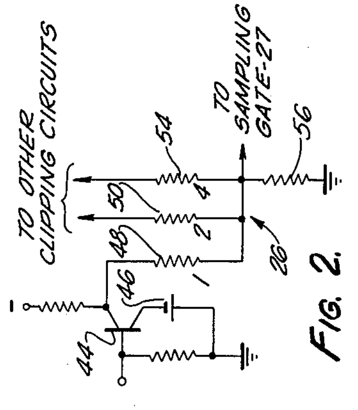
FIGURE 2 is a circuit diagram of a clipping circuit and a digital-to-analog converter.

FIGURE 2 shows, by way of example, a clipping circuit and digital-to-analog converter which may be employed with this invention. The clipping circuit can be a transistor 44, to the base of which the output from the photoelectric image scanning device is applied. The emitter of the transistor may be biased by a battery 46, so that in order to be rendered conductive the signal applied to the base of the transistor must exceed the predetermined biasing potential established by the potential source 46. Here for example, the bias signal applied is such that the transistor is rendered conductive only in the presence of a white picture element at the photoelectric scanner. Then, the output of the transistor is a binary signal.

The digital-to-analog converter 26 will include a separate input resistor respectively 48, 50, 54, having one end connected to each one of the respective clipping circuits 20, 22, 24, and the other end brought to a summing resistor 56. The resistors 48, 50, and 54 have their resistance value selected whereby they will bear the relationship of 1, 2 and 4 with respect to each other. Thus, the output from the resistor 56 will be a voltage whose amplitude is determined by the presence and absence of binary signals being applied to the resistors 48, 50, and 54. Assuming that the amplitude of the signal applied to the transmitter has a unit value of 1 when a binary signal is applied to the resistor 48, it will have a unit value of 2 when a binary signal is applied to the resistor 50, a unit value of 4 when the binary signal is applied to the resistor 54, and a unit value will thereafter be a sum which is determined by the sum of the voltages applied to the resistor 56.

Figure 3:
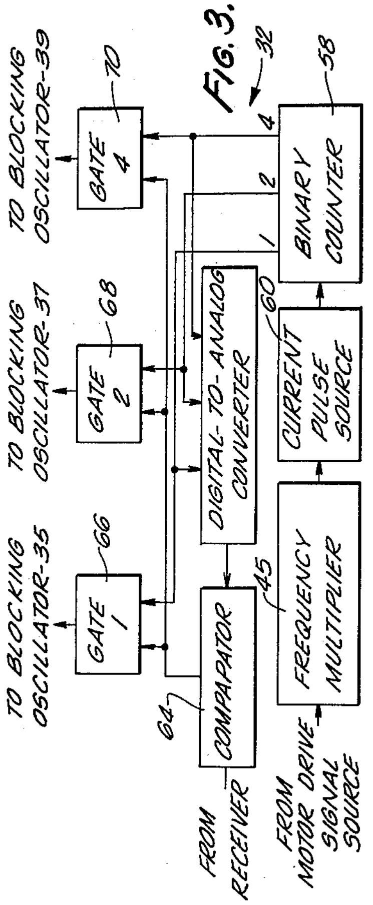
FIGURE 3 is a block diagram of an analog-to-digital converter.

FIGURE 3 is a block diagram, illustrating by way of example, an analog-to-digital converter which may be employed at the receiver. This will include a binary counter 58 which, by way of example, may comprise three binary stages, the respective weights of whose outputs are 1, 2 and 4. This does not mean that these outputs have the relative amplitudes of these figures, merely that the weights given, whenever there is an output from these respective binary stages, represents 1, 2 and 4. A count pulse source 60, which is driven from the output of the frequency multiplier 45 at a frequency which is eight times greater than the frequency of the sampling gate 27 at the receiver, continuously applies pulses to the binary counter to cause it to continuously count through a complete cycle for every sample pulse received. The output of the binary counter 58 is applied to a digital-to-analog converter 62, which may be identical to the digital-to-analog converter 26. The converter 62, provides as an output an analog signal representative of a count of a binary counter 58. This output is applied to the comparator 64, which compares the amplitude of the input from the converter 62, with the amplitude of the analog signal received from the transmitter. When these two amplitudes are identical then the comparator provides an output indicative thereof. This output is simultaneously applied to three coincidence gates, respectively gate 66, 68, and 70.

The respective 1, 2 and 4 count outputs of the binary counter 58, are respectively applied to the inputs of gates 66, 68, and 70. As a result, whenever the output of the converter 62 equals in amplitude the analog signal received, the comparator provides an output. Those of the gates which at that time are receiving a second input from the binary counter 58, will be enabled to apply an output. Since the output from each one of the gates 66, 68, 70, is connected to energize a reproducing transducer occupying a position corresponding to the position of the scanning transducer at the transmitter which initiated the received binary signal, an accurate reproduction of these signals will occur.

There has accordingly been described herein a novel, useful and bandwidth saving system for transmitting facsimile information at a higher rate with a minimum of additional equipment at both transmitter and receiver.

I claim:

1. The improvement in a facsimile system of the type wherein at a transmitter a document is sequentially scanned one picture element at a time to generate representative electrical signals which are sent to a receiver wherein the picture elements represented by these signals are reproduced on a document one element at a time, said improvement comprising means for simultaneously scanning on a document a plurality of discrete picture elements at a time to generate a first digital signal for each discrete picture element, means for converting all said digital signals to a representative analog signal, means at a receiver for converting said representative analog signal to a second digtial signal for each discrete picture element corresponding to the digital signals generated at the transmitter and means for simultaneously reproducing the picture elements represented by said second digital signals.

2. A facsimile system for scanning a document at a transmitter and for reproducing said document at a receiver comprising a transmitter and a receiver said transmitter having a plurality of document picture element scanning means, means positioning said picture element scanning means for simultaneously scanning said document, each of said picture element scanning means including means for generating a first digital signal representative of the picture element being scanned, means for converting digital signals to a single analog signal, means for applying said first digital signals to said means for converting digital to a single analog signal to generate a representative analog signal, said receiver having means for converting said representative analog signal to a plurality of second digital signals each corresponding to one of said first digital signals a plurality of picture element writing styli, means positioning said writing styli for simultaneously writing on said document, and means for applying each of said second digital signals simultaneously to a different one of said styli for reproducing the picture elements represented by said second digital signals.

3. In a facsimile scanner of the type wherein at a transmitter a document is attached to a rotatable drum and a photoelectric picture element scanning device is moved along a line across said drum as said drum rotates to scan said document in a helical path and to provide output signals representative of each picture element, and at a receiver a picture element reproducing styli is similarly positioned and moved adjacent a synchronously rotating drum to reproduce the scanned document, the improvement comprising a plurality of photoelectric picture element scanning devices, means positioning said plurality of photoelectric picture scanning devices adjacent one another and adjacent said rotating drum for effectuating a scan of said document, each of said photoelectric picture scanning devices including a clipping circuit for only passing signals exceeding a predetermined level for effectuating a binary signal representative of each picture element, digital to analog means to which all the said binary signals are applied for providing an analog signal representative thereof, said receiver including means to which said analog signal is applied for reestablishing the plurality of binary signals represented thereby, a plurality of reproducing styli, means positioning said reproducing styli adjacent said synchronously rotating drum for substantially simultaneously reproducing the picture elements being scanned at said transmitter, and means for applying each of said reestablished binary signals to the reproducing styli which will reproduce the picture element represented thereby at its proper location.

4. In a facsimile scanner of the type wherein at a transmitter a document is attached to a rotatable drum and a photoelectric picture element scanning device is moved along a line across said drum as said drum rotates to scan said document in a helical path and to provide output signals representative of each picture element, and at a receiver a picture element reproducing styli is similarly positioned and moved adjacent a synchronously rotating drum to reproduce the scanned document, the improvement comprising a plurality of photoelectric picture element scanning devices, means positioning said plurality of photoelectric picture scanning devices adjacent one another and adjacent said rotating drum for effectuating a scan of said document, each of said photoelectric picture scanning devices including a clipping circuit for only passing signals exceeding a predetermined level for effectuating a binary signal representative of each picture element, digital to analog means to which all of said binary signals are applied for providing an analog signal representative thereof, means for sampling said analog signal at a predetermined rate to provide a sampled analog signal output; said receiver including a cyclic counter for sequentially and recurrently generating output digital signals, digital to analog signal converter means to which said digital signals are applied for cyclically generating analog signals of different amplitudes, means for comparing said different amplitude analog signals with said sampled analog signal output to provide an identity signal in the presence of an identity of said signals, a plurality of reproducing styli, means positioning said reproducing styli adjacent said synchronously rotating drum for substantially simultaneously reproducing the picture elements being scanned at said transmitter, a different gate for each reproducing stylus, means connecting each gate output to a different one of said styli for energization thereof when said gate is enabled, and means for applying the digital signal output from said counter and said identity signal of said comparator to all of said gates for enabling responsive thereto the gates connected to styli in locations corresponding to the locations of the photoelectric picture element scanning devices from the outputs of which the sampled analog signal applied to the comparator at the time is derived.

References Cited by the Examiner

UNITED STATES PATENTS

| | | | |
|---|---|---|---|
| 1,817,098 | 8/1931 | Ranger et al. | 178—6.6 |
| 2,370,160 | 2/1945 | Hansell | 178—6.6 |
| 2,413,965 | 1/1947 | Goldsmith | 178—6.6 |
| 2,575,714 | 11/1951 | Johnson | 178—6.6 |
| 2,807,663 | 9/1957 | Young | 178—6.6 |
| 3,024,311 | 3/1962 | Jipp | 179—15 |
| 3,030,618 | 4/1962 | Nilsson | 340—172 |

DAVID G. REDINBAUGH, *Primary Examiner.*

STEPHEN W. CAPELLI, *Examiner.*

T. G. KEOUGH, J. A. ORSINO, *Assistant Examiners.*